United States Patent [19]

Zundel

[11] 4,360,851
[45] Nov. 23, 1982

[54] ELECTRONIC CIRCUIT BREAKER

[75] Inventor: Andrew T. Zundel, Warren, Mich.

[73] Assignee: Portable Tool & Electronics Inc., Warren, Mich.

[21] Appl. No.: 169,560

[22] Filed: Jul. 17, 1980

[51] Int. Cl.³ .............................................. H02H 3/26
[52] U.S. Cl. ..................................... 361/59; 361/101; 361/93
[58] Field of Search ..................... 361/59, 60, 93, 100, 361/101

[56] References Cited

U.S. PATENT DOCUMENTS 3,748,569  7/1973  Frank et al. ...................... 361/59 X

FOREIGN PATENT DOCUMENTS 2415305  10/1975  Fed. Rep. of Germany ...... 361/100

Primary Examiner—Harry E. Moose, Jr.
Attorney, Agent, or Firm—Krass, Young & Schivley

[57] ABSTRACT

An electronic circuit breaker is tripped to interrupt the flow of current to a load when the load experiences an over-current condition and is automatically reset by disconnection thereof from the load. A first control circuit including a first voltage comparator senses the level of current flowing through the load and operates a solid-state control switch to interrupt current flow when the sensed current exceeds a prescribed level. A second control circuit comprising a second voltage comparator is operative to latch the control switch in its operated condition interrupting current flow even though the level of current sensed by the first control circuit drops below the prescribed level. The second control circuit automatically responds to disconnection of the load from the circuit breaker to unlatch the control switch thereby resetting the circuit breaker to resume normal operation when another load is connected thereto.

6 Claims, 2 Drawing Figures

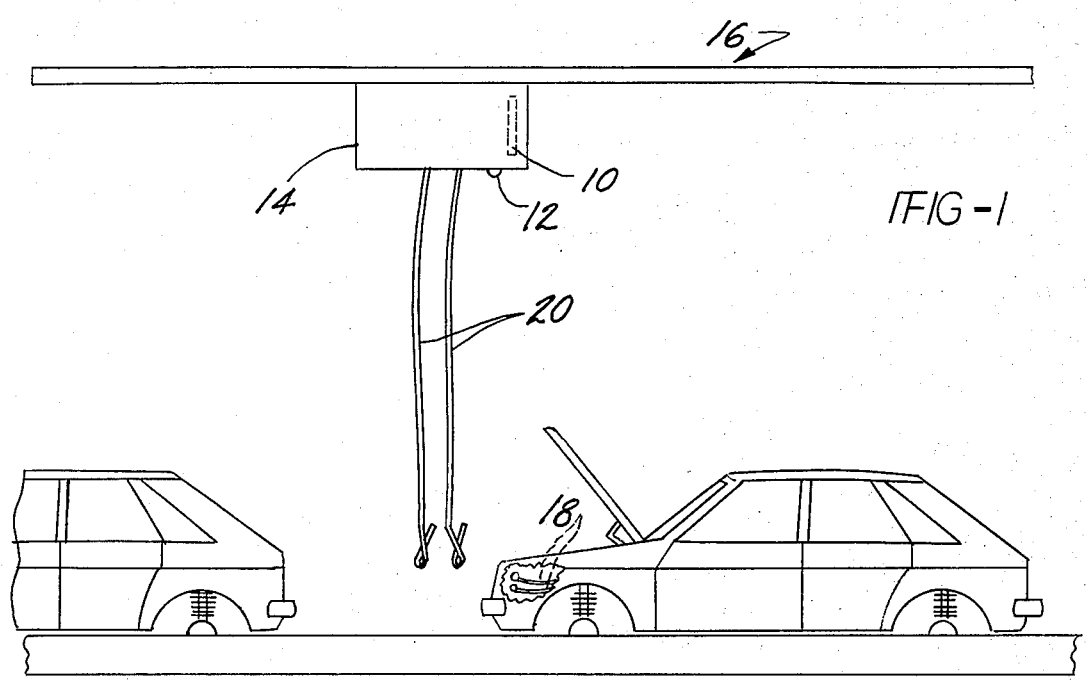

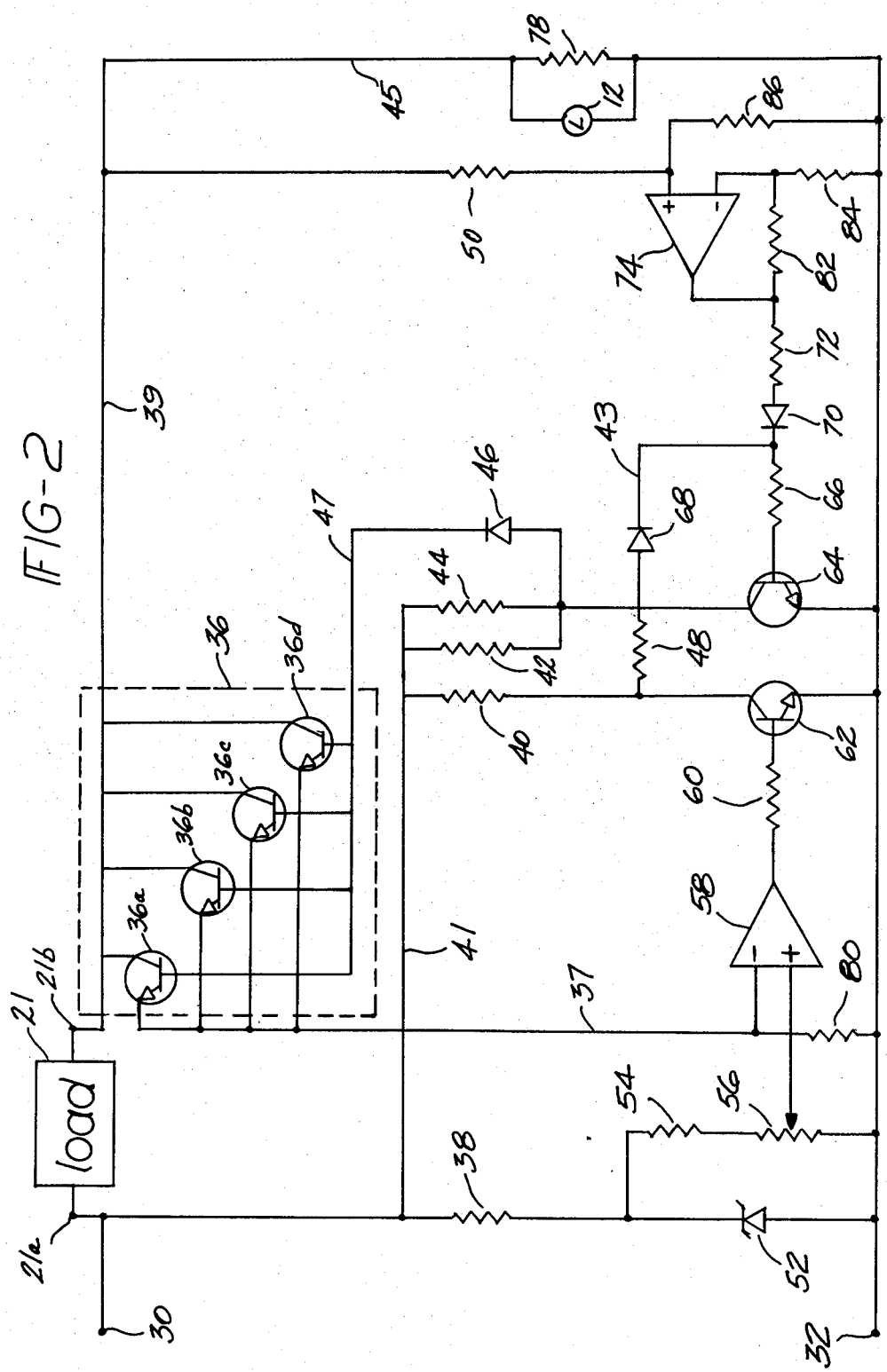

ELECTRONIC CIRCUIT BREAKER

TECHNICAL FIELD

The present invention generally relates to electrical circuit breakers and deals more particularly with an electronic circuit breaker for detecting and controlling over-current conditions such as short circuits.

BACKGROUND ART

Electronic circuit breakers are employed in numerous applications in order to detect a short circuit across a load, "trip" in order to protect the load from electrical damage, and then automatically reset after the load has been disconnected. For example, on various types of assembly lines, such as those used to manufacture automobiles, the electrical system of each vehicle is tested by a worker before the electrical battery is installed in the vehicle. In order to test the vehicle's electrical system, a worker connects an external 13-volt d.c. supply to the vehicle's battery cables. In the event that one or more portions of the vehicle's electrical system contains a short, damage to the external power supply is prevented by a circuit breaker interposed between the vehicle's electrical system and the power supply.

In the past, known mechanical and electronic circuit breakers used in the context described above required manual resetting each time the circuit breaker was tripped by a short circuit. In the case of an assembly line operation where short circuits in newly assembled products occur with relative frequency, it becomes time-consuming and troublesome for the assembly line worker to reset the circuit breaker each time it is tripped. Reset mechanism must be provided which is physically adjacent the assembly line worker, moreover the worker may not always have sufficient time to properly reset the circuit breaker, and in some cases, the worker may inadvertently neglect to operate the reset mechanism. Obviously in a large scale assembly line operation, the line may not be shut down simple to allow a worker additional time to complete his assigned task; as a result, the worker may fail to test some products, in which case electrical defects may go unnoticed by the manufacturer, or the required electrical testing must be performed in a non-assembly line operation after the vehicle is removed from the line.

None of the known prior art circuit breakers provide an acceptable solution to the problem mentioned above. For example, U.S. Pat. No. 3,538,426 to JONES discloses an electronic circuit breaker which interrupts current flow to the load for short periods of time when an over-current defect is detected, and subsequently resumes delivery of electrical power regardless of whether or not the electrical defect is still present. Thus, a circuit breaker of this type continues to switch on and off, and therefore intermittently delivers potentially damaging current through a short circuited system. None of the known prior art circuit breakers provide, however, a system in which current from a power supply is continuously interrupted but is automatically reset when the load is removed therefrom.

Accordingly, it is a primary object of the present invention to provide an electronic circuit breaker which eliminates the deficiencies inherent in prior art circuit breaker designs and is operative to interrupt current flow to a load having a short circuit defect until the load is removed therefrom, but which is automatically reset in response to disconnection of the load therefrom.

Thus, the circuit breaker of the present invention is automatically reset merely by disconnecting the load therefrom and is readied for connection to another load without the need for manually operating reset mechanisms or the like.

Another object of the present invention is to provide a solid-state circuit for detecting over-current conditions in an electrical load, without the need for mechanical switches or components.

A further object of the invention is to provide a circuit breaker of the type mentioned above which reduces the current flow from a power supply to a load having a short circuit condition to a relatively low level until the load is removed from the circuit breaker.

A still further object of the invention is to provide a circuit breaker of the type described above which introduces a relatively low voltage drop across the power supply lines even at relatively high current levels.

These and further objects of the invention will become clear or will be made apparent during the course of the following description.

BRIEF DESCRIPTION OF THE INVENTION

The electronic circuit breaker of the present invention is particularly suited for interrupting current flow to loads which are repeatedly connected and disconnected from a power supply. The circuit breaker includes an electronic switch for amplifying current delivered to the load. The level of amplified current is compared to a preset reference level and is allowed to continuously flow to the load if the level thereof is less than the reference level. When the amplified current delivered to the load exceeds the reference level, a first control circuit turns off the electronic switch and current flow is shunted to ground. Simultaneously, a second control circuit is activated which latches the electronic switch in its off state. The second control circuit is unlatched in response to disconnection of the load from the circuit breaker, thereby allowing the first control circuit to turn on the electronic switch to resume delivery of current to another load.

BRIEF DESCRIPTION OF THE DRAWINGS

In the drawings, which form an integral part of the specification and are to be read in conjunction therewith, and in which like components are designated by identical reference numerals in the various views:

FIG. 1 is a perspective view of an electrical testing system for use in an assembly line operation employing the circuit breaker forming the preferred embodiment of the present invention; and FIG. 2 is a detailed schematic diagram of the circuit breaker employed in the application shown in FIG. 1.

DETAILED DESCRIPTION OF THE INVENTION

The electronic circuit breaker of the present invention is readily adaptable for use in many applications where it is desired to limit the magnitude of current flow from a power supply to a load, but is particularly advantageously employed in connection with those applications where a single load, or a plurality of loads is repeatedly connected and disconnected from an electrical power source. For example, as shown in FIG. 1, one application involving the need for temporarily connecting a load to a power supply relates to a vehicle assembly line in which the electrical system of a vehicle is tested during assembly thereof. In order to test the vehicle's electrical system, the battery cables 18 of the vehicle's electrical system are releasably connected to electrical supply lines 20. Supply lines 20 are mounted for sliding movement along a conductive supply track 16 which is electrically connected to a power supply 14. Power supply 14 is coupled with a suitable source of electrical power (not shown) and provides a 13-volt d.c. output to the track 16. An electronic circuit breaker 10 is operably coupled between the output terminals of the power supply and the track 16 for selectively interrupting the flow of current to the supply lines 20 when a short circuit is present in the vehicle's electrical system.

In the event of such a short circuit, the circuit breaker 10 is operative to interrupt the flow of current to the vehicle's electrical system and an indicator lamp 12 is illuminated to indicate that the circuit breaker has been tripped. The circuit breaker 10 is automatically reset in response to disconnection of the lines 20 from the battery cables 18 of the vehicle. If the short circuit condition in the tested vehicle is corrected, lines 20 may be reconnected to battery cables 18 for further testing, or may be connected to the electrical system of the next-in-line vehicle. In any event, it may be appreciated that the circuit breaker 10 is automatically reset the moment the lines 20 are disconnected from the battery cables 18 of a vehicle whose electrical system includes a short circuit defect.

Referring also now to FIG. 2, the electronics circuit breaker of the present invention includes a pair of input terminals 30 and 32 respectively coupled to a suitable source of direct current, such as the power supply 14, and ground. The battery cables 18 of the vehicle, or any other suitable load 21, are connected to a pair of output terminals 21A and 21B. In the absence of a short circuit condition in the load 21, current flows from terminal 30 through the load 21 into the switching means 36 comprising a plurality of parallel coupled power transistors 36A–36D which are normally conductive and deliver electrical current through resistor 80 to the ground terminal 32.

A first control circuit comprising operational amplifier 58, transistor 62, and transistor 64, are provided for sensing the level of current flowing through the load 21 and are operable for controlling the switching means 36 when the current level exceeds the prescribed level thereof. More particularly, the negative or comparing input of operational amplifier 58 is connected with the output of switching means 36 via line 37, while the voltage for the reference or positive input of operational amplifier 58 is established using resistor 38 and zener diode 52 connected between terminals 30 and 32 in conjunction with a voltage divider comprising resistor 54 and potentiometer 56. The level of current flow through the load 21 at which the circuit breaker is tripped is determined by the setting of potentiometer 56.

In order to detect a short circuit in the load 21, op amp 58 compares the voltage on line 37 with the reference voltage set by potentiometer 56. Assuming that a short circuit condition does not exist, the voltage on line 37 is less than the reference voltage and the output of op amp 58 is positive. When the voltage level on line 37 exceeds the reference level, the output of op amp 58 becomes negative.

A second control circuit including operational amplifier 74 is provided for latching the switching means 36 in a switched, or "tripped" condition once the latter is actuated by the first control circuit, and is further operable for resetting the switching means 36 when the load 21 is disconnected from terminals 21A and 21B. The positive input of op amp 74 is connected to the load 21 via line 39 and resistor 50, and to the ground terminal 32 through resistor 86. The negative input of op amp 74 is coupled to the output thereof through resistor 82 and to ground 32 via resistor 84 in order to maintain the voltage at the negative input thereof at a value marginally above ground. Assuming that the switching means 36 are conducting, minimal current flows through the voltage divider defined by resistors 50 and 86, consequently the voltage at the positive input of operational amplifier 74 is lower than the negative input thereof; under these conditions, the output of operational amplifier 74 is negative. In the event of a short circuit in the load 21, however, switching means 36 is turned off and the voltage at the positive terminal of op amp 74 exceeds voltage at the negative input, consequently the output of op amp 74 becomes positive.

A better appreciation of the construction of the electronic circuit breaker of the present invention can best be provided by the following detailed description of the operation thereof. Assuming for the moment that a load 21 has not yet been connected to the circuit breaker, current flows from terminal 30 via line 41 through resistors 42 and 44 as well as diode 46 to the bases of transistors 36A–36D, thereby rendering the latter conductive. However, since terminal 21B is not connected to a load, current is prevented from flowing through the switching means 36, consequently the voltage on the negative input to op amp 58 is essentially zero. Current does flow, however, through resistor 38 and zener diode 52 between terminals 30 and 32, thereby establishing a relatively high level of reference voltage at the positive input of op amp 58; since the voltage at the positive input of op amp 58 exceeds the voltage at the negative input thereof, the output of op amp 58 is positive. The positive output of op amp 58 is delivered through resistor 60 to the base of transistor 62, thereby shunting current flow on line 41 through resistor 40 to the ground terminal 32. The base of transistor 64 is connected with the collector terminal of transistor 62 by line 43, resistors 48 and 66, and diode 68.

Transistor 64 does not conduct, i.e. is "off", since transistor 62 shunts current from line 41 away from line 43 to ground terminal 32. The volage at the positive input of op amp 74 is zero since no current flows through line 39 and resistors 50 and 86. Since the negative input of op amp 74 is equal to or higher than the positive input thereof, the output is negative. The output of op amp 74 is connected to the base of transistor 64 through the resistors 66 and 72 and diode 70. Resistor 72 in combination with diode 70 prevent the negative output of op amp 74 from turning on transistor 64. In summary, when a load 21 is disconnected from terminals 21A and 21B, the outputs of op amps 58 and 74 are positive and negative respectively, switching means 36 as well as transistor 62 are on, and transistor 64 is off.

When a load 21 is connected across terminals 21A and 21B, current flows from terminal 30, through the load 21 and through the switching means 36, as well as through line 37 to ground 32. The current flow through line 37 to ground 32 raises the voltage level at the negative input of op amp 58, however, assuming that a short circuit condition in the load 21 does not exist, the voltage level at the positive input of op amp 58 remains above the voltage at the negative input thereof, consequently the output of op amp 58 remains positive. Since the transistors 36A–36D remain conductive, a minimum level of current is delivered through line 39 to the voltage divider comprising resistors 50 and 86. The output of op amp 74, therefore, remains negative. At this point, however, insufficient current flows through lines 39 and 45 to illuminate the lamp 12.

In the event that the load 21 includes a short circuit condition therein, the current through such load substantially rises. This increase in current flow results in a higher level of current being delivered through line 37. The increase in current flow through line 37 raises the voltage to the negative input of op amp 58 to a level higher than the voltage level at the positive input thereof, consequently, the output of op amp 58 goes negative, thereby turning off transistor 62. When transistor 62 is rendered non-conductive by op amp 58, the current through resistor 40 is diverted via line 43, resistor 48 and diode 68 to the base of transistor 64, thereby turning the latter on to conduct.

In the absence of a short circuit condition in the load 21, current normally flows through line 41, resistors 42 and 44, and diode 46 to the bases of transistors 36A–36D to render the latter conductive. However, under a short circuit condition, the current flowing through line 41 is shunted away from line 47 through transistor 64 to the ground terminal 32, thereby turning off transistors 36A–36D. At this point, with transistors 36A–36D turned off, the current flowing from terminal 21B through switching means 36 to ground terminal 32 via line 37 is interrupted. Thus, the voltage level at the negative input of op amp 58 drops below the voltage level at the positive input thereof, consequently the output of op amp 58 switches from negative to positive thereby turning on transistor 62.

Simultaneous with the turning off of switching means 36, the increased current flow in line 39 raises the voltage at the positive input of op amp 74 to a value above the voltage of the negative input thereof, consequently the output of op amp 74 switches to positive. The positive output of op amp 74 is delivered through resistors 66 and 72 as well as diode 70 to the base of transistor 64 thereby maintaining the latter in a conductive state, in spite of the fact that transistor 62 has been turned back on. From the foregoing, it may be appreciated that a second control circuit comprising op amp 74 functions to latch the switching means 36 in an off state until the circuit breaker is reset, as will be described below. The various components of the circuit remain in the state immediately described above as long as the short circuited load 21 is connected to terminals 21A and 21B. The lamp 12 is illuminated during the short circuit condition by virtue of the additional current flow in lines 39 and 45.

The electronic circuit breaker of the present invention is automatically reset in response to disconnection of the load 21 from terminal 21B. Upon disconnection of the load 21 from terminal 21B, current flow through line 39 is eliminated, thereby reducing the voltage level present at the positive input of op amp 74 to a value below the voltage at the negative input thereof. Accordingly, the output of op amp 74 switches from positive to negative. The negative output of op amp 74 is delivered to the base of transistor 64, thereby turning the later off. With transistor 64 off, current derived via terminal 30 and line 41 is delivered through resistors 44 and 42 as well as diode 46 through line 47 to the bases of transistors 36A–36D, thereby turning on the switching means 36. It will be recalled that op amp 58 has been previously reset such that the output thereof is positive. Consequently, the circuit is reset in readiness for reconnection of the load 21 at terminal 21B. Thus, it may be appreciated that the control circuit, including op amp 74, is further operative to automatically reset the switching means 36 in response to disconnection of the load 21.

It may be appreciated that by virtue of the fact that the components of the electronic circuit breaker are solid-state, extremely fast switching times are achieved, thereby minimizing the possibility of current overload damage to the load 21, while requiring low supply voltages. In fact, the electronic circuit breaker of the present invention is typically automatically reset in approximately fifty micro-seconds. Thus, the present circuit breaker is particularly adapted for use in an electrical system wherein the load is rapidly disconnected and reconnected to the circuit breaker. The relatively low voltage requirements of the circuit described above obviates the need for large power supplies, even when used in conjunction with electrical systems having high current levels.

From the foregoing, it may be appreciated that the electronic circuit breaker described above not only provides for the reliable accomplishment of the objects of the invention but does so in a particularly economical and reliable manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

Having thus described the invention, what is claimed is:

1. A device for interrupting delivery of electrical power to a load when said load demands electrical power in excess of a prescribed level thereof and is automatically reset to resume delivery of electrical power when said load is disconnected from said device, comprising:

terminal means adapted for connecting said load with a source of electrical power;

actuatable switching means operably coupled with said terminal means for selectively interrupting the delivery of electrical power from said source to said load, said switching means being actuatable between a set state in which electrical power is delivered therethrough to said load and a tripped state in which delivery of electrical power to said load is interrupted; and circuit means operably coupled with said switching means, said power source and said load for controlling the operation of said switching means, said circuit means including:

(1) first control circuit means for sensing the level of power demanded by said load and for actuating said switching means from said set state thereof to said tripped state thereof when said demand exceeds said prescribed level thereof, said first control circuit means including a first circuit element for comparing the magnitude of an electrical signal delivered through said switching means and representative of the electrical power demanded by said load with the magnitude of a reference signal, and for producing an output signal in accordance with the compared signals, and first and second interconnected electrical switches, said first switch being connected with said first circuit element for receiving said output signal therefrom, said second switch being connected with said switching means for selectively actuating the latter, and (2) second control circuit means operably coupled with said first control circuit means for actuating said switching means from said tripped state to said set state thereof in response to the disconnection of said load from said device, said second control circuit means including a second circuit element operably coupled with said second switch and operable for comparing the magnitude of an electrical signal derived from said load and representative of the electrical power demanded by said load with the magnitude of a reference signal, and for producing a control signal for delivery to said second switch in accordance with the compared signals, said control signal being operative for causing said second switch to actuate said switching means from said tripped state thereof to said set state thereof.

2. The device of claim 1, wherein said first and second control circuit means each comprise an operational amplifier and said first and second electrical switch each comprises a transistor.

3. The device of claim 2, wherein the bases of said first and second switches are respectively connected with the outputs of the first and second control circuit means.

4. The device of claim 1, wherein said first circuit element comprises an operational amplifier having a pair of inputs and said switching means is coupled between said load and one of said last named inputs.

5. The device of claim 4, wherein said second circuit element comprises an operational amplifier having at least one input connected with said load.

6. An automatically resetting circuit breaker for use in testing a load comprising:

terminal means for connecting a load to a source of current;

switch means in series circuit with the terminal means for defining a primary current path and for conducting load current through said primary current path when in a conductive state;

first comparator means having two inputs and an output, one input being connected to a safe load current reference signal, the other input being connected to receive a signal related to actual current through the primary current path, the output being connected to control the conductivity of the switch means and to render the switch means nonconductive if the actual current signal exceeds the safe current signal;

means defining a secondary current path including the load but shunting the switch means;

and secondary comparator means having two inputs and an output, one input being connected to the safe load current reference signal, the other input being connected to receive a signal from the secondary current path related to actual current through the load but independent of said switch means current, the output being connected to maintain the switch means nonconductive independently of the state of the first comparator means.

* * * * *